Sept. 24, 1968 — S. WAY ET AL — 3,403,277
DOWNSTREAM DAMPED HEAT LOSS REDUCING ELECTRIC ARC GAS HEATERS FOR WIND TUNNELS
Filed Feb. 26, 1965 — 2 Sheets-Sheet 1

INVENTORS
Stewart Way
& Edward V. Somers
ATTORNEY

United States Patent Office

3,403,277
Patented Sept. 24, 1968

1

3,403,277
DOWNSTREAM DAMPED HEAT LOSS REDUCING ELECTRIC ARC GAS HEATERS FOR WIND TUNNELS
Stewart Way, Churchill, and Edward V. Somers, Pittsburgh, Pa., assignors to Westinghouse Electric Corporation, Pittsburgh, Pa., a corporation of Pennsylvania
Filed Feb. 26, 1965, Ser. No. 435,558
13 Claims. (Cl. 313—35)

This invention relates to improvements in electric arc heaters for use with wind tunnels, and more particularly to an improved electric arc heater having means to reduce heating losses to the wall of a calming section downstream of the arc, and to methods of damping large churning velocities in the gas stream.

In electric arc heating of gas streams for high speed wind tunnels, experiments have shown high heating losses to the walls of the calming section downstream of the arc. Analysis of the losses indicates them to be mostly due to the extreme churning action of the heated gas stream induced by oscillating motion of the electric arc, with the net downstream flow of the gas making a negligible contribution to the heat loss.

These losses can be substantially reduced by proper damping of the churning action of the gases.

In summary, we accomplish the desired damping of the churning action downstream of the arc in several embodiments of our invention by a baffle or baffles composed of a highly heat resistant material, such as a ceramic, spaced in or near the entrance to the calming section. In some embodiments these baffles consist of a plurality of spaced slats extending either horizontally, or radially from a small central supporting tube. In other embodiments, the baffle comprises means forming a plurality of tubular passageways of small diameter, the passageways being adjacent each other in the calming section of the arc heater, so that substantially all gas must pass through the relatively narrow tubular passageways before exiting from the arc heater.

In still another embodiment of our invention suitable for high temperature gases which have been either thermally ionized or ionization seeded, we place a magnetic field across or along the churning flow path to produce eddy currents in the gas stream. The eddy current loss consumes the kinetic energy associated with the churning action, and damps out any large circumferential churning velocities.

Accordingly, an object of our invention is to provide new and improved arc heater apparatus.

Another object of our invention is to provide new and improved downstream damped electric arc heaters for use with wind tunnels.

A further object is to provide new and improved methods of damping the turbulence downstream of the arc of an arc heater, to reduce heat losses to the wall of the heater apparatus.

These and other objects will become more clearly apparent after a study of the following specification, when read in connection with the accompanying drawings, in which:

FIG. 5 is a view of still an additional embodiment of

2 apparatus for practicing our invention according to a second method of damping turbulence downstream of the arc of an arc heater.

Figures 1A, 1B, 1C, 2A, 2B:
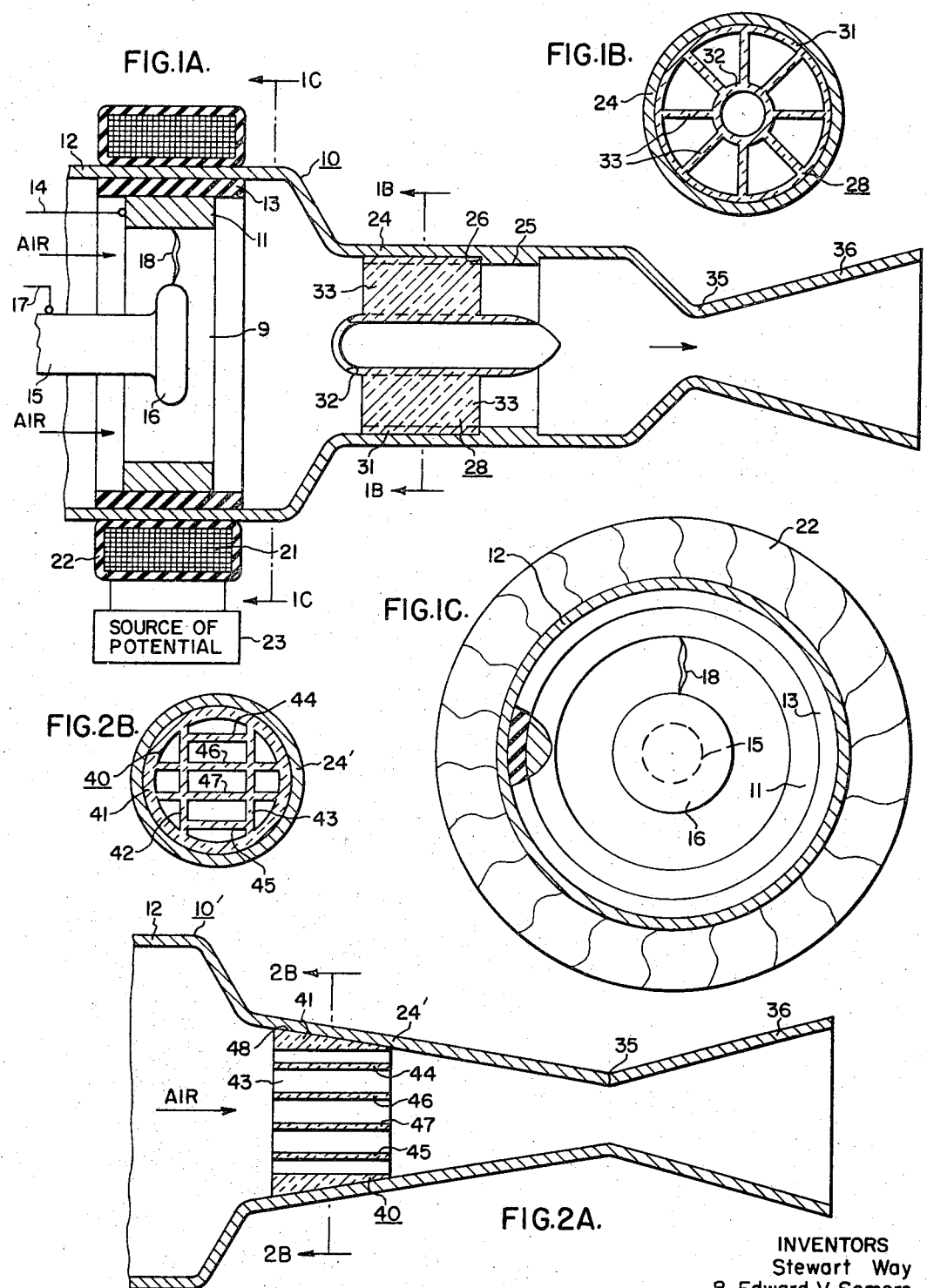
FIGS. 1A, 1B and 1C are views of an arc heater and damping apparatus according to one embodiment of our invention, and illustrate one method of practicing our invention.
FIGS. 2A and 2B are views of apparatus according to a second embodiment of our invention.

Referring now to the drawings, in which like reference numerals are used throughout to designate like parts for a more detailed understanding of the invention, and in particular to FIG. 1A, there are shown the essential parts of an arc heater generally designated 10, having an annular electrode 11 composed of electrically conductive material disposed therein insulated from the wall 12 of the arc heater by a ring 13 of heat resistant, electrically insulating material. Lead 14 symbolizes means for bringing a potential to electrode 11. Disposed within the arc heater, preferably coaxially therein to provide an arc path of uniform length, is a stem electrode 15 having a disc portion, or portion of enlarged diameter, 16. Lead 17 connected to electrode 15 symbolizes means for bringing a potential to electrode 15 to produce the arc 18 between disc portion 16 and the ring electrode 11. It is noted from the drawing that the stem electrode does not extend axially a substantial distance beyond the arc path between the stem electrode and the annular electrode.

Disposed around the outside of the wall 12, which it is understood is composed of a non-magnetic material, is a field coil 21 enclosed in an insulating housing 22. Lead means connects the field coil 21 to source 23 for bringing an energizing potential thereto to set up a magnetic field within the arc chamber 10. It is seen that the magnetic field created by the coil 21 is substantially transverse to the path of the arc 18, and accordingly a force is set up by reaction of the arc current and the magnetic field which tends to rotate the arc 18 in an annular path around electrode disc portion 16 between the electrode disc portion 16 and the annular electrode 11. It will be understood that where a direct current is applied to the field coil 21 and an alternating current is applied between leads 14 and 17 to produce the arc 18, the force exerted on the arc 18 to move the same reverses its direction with reversals in the polarity of the alternating current during each cycle so that the direction of angular rotation of the arc 18 periodically changes.

Means, not shown for convenience of illustration, is provided for admitting air or other gas into the arc chamber 9, the air passing in a left-to-right direction, FIG. 1A. It will be apparent that since the arc 18 rotates substantially continuously in the annular path provided therefor, that the heating is not uniform throughout the air or other gas, and as a result certain portions of the air are raised to a very high temperature by the very hot arc 18 and other portions of the air are relatively unheated. The changes in temperature produce great changes in pressure and density in the air with a resulting turbulence as the air exits from the chamber 9 of the arc heater into the passageway of relatively narrow diameter with the wall 24, to be referred to hereinafter as the calming section.

The wall portion 24 of the calming section is seen to have an inwardly extending annular flange portion 25 forming a shoulder 26 which abuts against a baffle generally designated 28 consisting of an outer tube portion 31 and an inner tube portion of smaller diameter 32 with a plurality of radially extending slats 33 at spaced intervals around the periphery of tube 32 and interconnecting the inner and outer tube portions. The inner and other tubes and the slats 33 may be formed integrally of a suitable heat resistant ceramic.

The baffle 28 is held in place against the pressure of the air flow by aforementioned inwardly extending annular flange 25.

In operation, slats 33 provide damping by frictional dissipation of the circumferential kinetic energy. By reducing or eliminating the gross swirling motions by the baffles, the length of the calming section and the heat loss from it can be reduced. The downstream and radial lengths of the damping slats which will provide optimum damping can be ascertained experimentally by simple methods. Air after leaving the damping or calming section ad the baffle 28 passes through the neck portion 35 of the exhaust nozzle 36 which it is understood may be operatively connected to wind tunnel apparatus. It is noted that according to the drawing the time which air remains in the baffle as it passes therethrough is sufficient to effect substantial calming and elimination of gross swirling motions but insufficient to result in substantial heat loss to the baffle means and by conduction therethrough to the wall of the arc chamber. It is further noted that the baffle means is close to the arc path to ensure that as small a portion of the arc chamber wall as possible is made to come in contact with the heated gases before the calming operation is performed.

FIG. 1C is a section through the line 1C—1C of FIG. 1A, and further shows the electrode arrangement inside the chamber 9.

Particular reference is made now to FIGS. 2A and 2B, where apparatus according to a second embodiment of our invention is shown. In FIG. 2A, which is a section through the baffle of the arc heater in a vertical plane containing the longitudinal axis, the baffle is generally designated 40, is generally frustoconical in shape, and has an outer sleeve portion 41 with the tapering wall 48, FIG. 2B. Disposed inside the sleeve portion 41 and preferably integral therewith are a pair of vertically extending slats 42 and 43, and disposed also within the baffle structure are four horizontally extending baffle slats, the upper and lower slats being designated 44 and 45, FIG. 2B, and the middle two being designated 46 and 47, the middle two extending all the way between opposite wall portions of the sleeve 41, the upper and lower horizontally extending slats 44 and 45 extending between the vertical slats 42 and 43. It will be seen, FIG. 2B, that a plurality of relatively small or narrow passageways are provided through or between the slats. The operation of the vertical and horizontal slats of FIGS. 2A and 2B is substantially similar to the operation of the radially extending slats 33 of FIGS. 1A and 1B; the slats 42–47 perform their baffle function because extensive turbulence in the gas flow is dissipated by the slats where the flow is restricted, so that the heat loss to the wall 24' of the arc heater is reduced.

It will be understood that electrodes are included within the arc heater of FIG. 2A, and that a magnetic field coil is provided, these are not being shown for convenience of illustration, air or other gas passing from a left to a right-hand direction and after passing through the baffle 40 passing thence through the neck portion 35 and the exhaust nozzle 36 and thence into a wind tunnel, not shown, if desired. It is further seen, FIG. 2A, that the wall portion 24' of the calming section of the apparatus is tapered in a manner similar to the tapering of the wall 48 of the baffle 40, so that the baffle is retained by the tapering wall of portion 24' against movement in response to forces exerted thereon by the air or other gas from the arc.

Figure 3A:
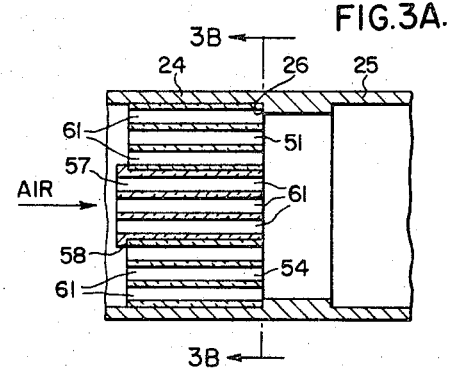
FIGS. 3A and 3B are views according to a third embodiment of our invention.
Figure 3B:
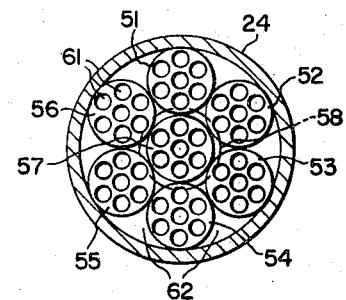

Particular reference is made now to FIGS. 3A and 3B where an additional embodiment of our invention is shown. In FIG. 3B the baffle is seen to consist of a plurality of generally cylindrical baffle elements 51, 52, 53, 54, 55, 56 and 57, the dimensions of which have been suitably chosen so that the 7 baffle elements snugly fit inside the wall 24 of the calming section, the outer edges of 6 of the baffle elements abutting against the shoulder 26 formed by the inwardly extending annular flange portion 25 in the wall 24 and being thereby retained against movement in response to forces applied thereto by gas flowing through the baffle in the direction indicated by the arrow, the centrally disposed baffle element 57 having at the air input end thereof an outwardly flaring annular lip portion 58 which overlaps adjacent portions of the other 6 baffle elements, as shown in FIGS. 3A and 3B, the annular lip 58 retaining the baffle element 57 against movement in response to forces applied thereto by the gases. Each of the baffle elements is seen to have a plurality of axially extending bores of small diameter 61 therethrough, any convenient number of bores being provided, most of the gas passing through the small bores 61 in the plurality of elements, a small portion of the gas passing through spaces 62 between the baffle elements. The restriction of the gas in the narrow bores 61 interrupts turbulent flow and reduces heat transfer to the wall 24. It will be understood that in FIG. 3A, gas flows from left to right in a manner similar to that described in connection with FIG. 1A.

Figure 4A:
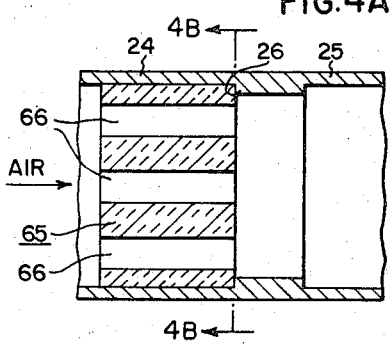
FIGS. 4A and 4B are views according to a fourth embodiment of apparatus for practicing our invention.
Figure 4B:
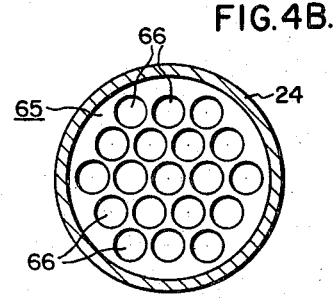

Particular reference is made now to FIGS. 4A and 4B, where a fourth embodiment of the invention is shown. The baffle generally designated 65 consists of a single baffle element having dimensions so that the baffle element snugly fits the inside wall of the damping or calming section 24 and is retained in place therein by the shoulder 26 of the aforementioned flange portion 25. Baffle member 65 has a plurality of small bores 66 extending therethrough, all of the gas passing through the small axially extending bores 66, where the turbulence is reduced with a resulting reduction in heat transfer to the wall of the arc heater.

In summary, al of the embodiments of FIGS. 1, 2, 3 and 4 permit the satisfactory practice of one basic method of the invention, which consists in dividing the total flow of gas into a plurality of flow channels of small diameter isolated from each other, whereby churning velocities are reduced, the turbulence is damped, and less heat energy is transferred to the wall of the arc heater.

Figure 5:
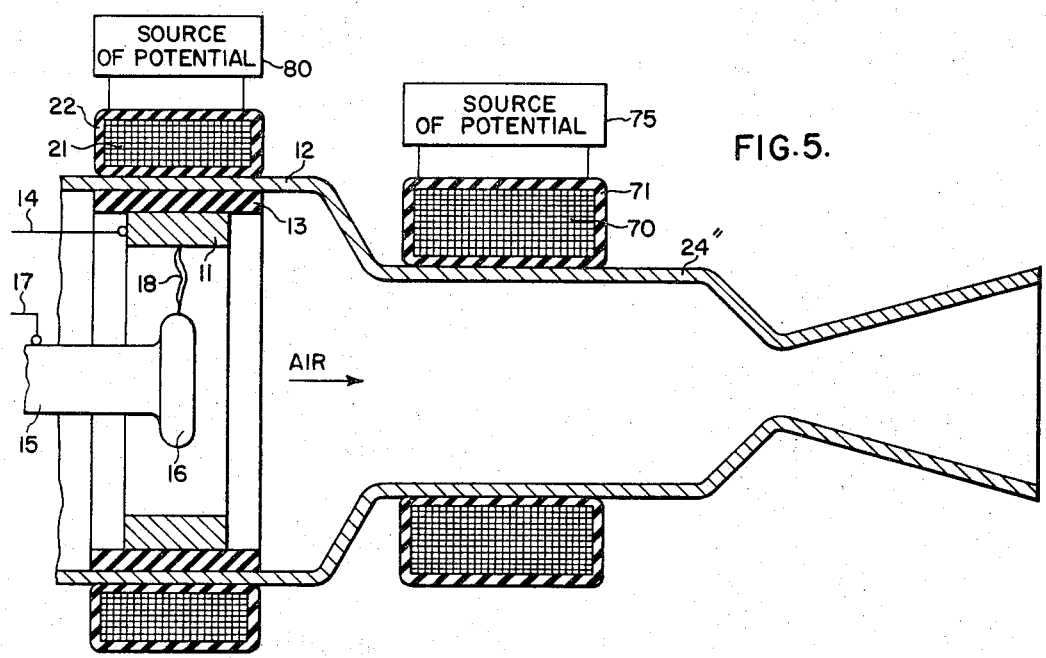

Particular reference is made now to FIG. 5, which shows apparatus for practicing the invention according to another method. The apparatus of FIG. 5 is suitable only for gases which are conductive to some extent, such for example as thermally ionized gases or ionization seeded gases. The apparatus of FIG. 5 includes the stem electrode 15 with the disc-shaped arcing surface 16 disposed coaxially in the arc heater, with an arc 18 taking place to an annular ring electrode 11 insulated from the wall of the arc heater, which is composed of non-magnetic material, by an insulating ring 13 and having a field coil 21 in housing 22 disposed around the outside of the wall 12 adjacent the ring electrode 11, the field coil 21 being energized from source 80 and setting up a magnetic field which causes the arc to rotate substantially continuously in an annular arc path. As previously stated, gas passing through the apparatus of FIG. 5 is conductive to some degree. Disposed around the outside of the wall portion 24" of the damping section is an additional field coil 70 in a housing 71. Preferably the field coil 70 is energized by direct current potential from source 75. The magnetic field of the coil 70 lies across or along the churning flow path, preferably parallel or perpendicular to the direction of gas flow, and produces eddy currents in the gas stream. The eddy current loss consumes the kinetic energy associated with the churning action, and damps out the large circumferential churning velocities. Generally speaking, the greater the degree of conductivity of the gas, the more effective or efficient the damping is. The stronger the magnetic field, the larger the eddy currents produced. The apparatus of FIG. 5 then is suitable for practicing the second method of our invention, which comprises subjecting a conductive gas to a magnetic field so disposed as to produce eddy currents in the gas stream which consume the kinetic energy of the churning action and damp out large circumferential churning velocities. It is noted from FIG. 5 that the construction of the arc heater is such that the stem electrode does not extend axially a substantial distance beyond the arc path between the stem electrode and the annular electrode, and it is fur ther noted from FIG. 5 of the drawing that the magnet 70 is close to the arc path in order to reduce the portion of the arc heater wall encountered by hot gases before the hot gases are subjected to the claiming interaction with the magnetic field.

For a more detailed discussion of the eddy current effect, reference may be had to a work by L. P. Harris entitled "Hydromagnetic Channel Flows," Technology Press, 1960.

It will be understood that the arc heaters of the drawings are not necessarily to the scale which would be used in practice, and that changes in any dimension may be made as desired.

It will be understood that other electrode configurations could be employed, for example, axially aligned spaced electrodes in the arc chamber.

Whereas the baffles are shown as cylindrical, it will be understood that other shapes could be employed, suitable changes in the wall shape being made.

Whereas we have shown and described our invention with respect to some exemplary embodiments thereof which give satisfactory results in the practice of our methods, it should be understood that changes may be made and equivalents substituted without departing from the spirit and scope of the invention.

We claim as our invention:

1. In arc heater apparatus having means forming a substantially continuously moving arc and means for channeling gas to be heated past the arc, the combination of exhaust means for the heated gas including means forming a calming section, and means disposed in predetermined position with respect to the calming section for damping gross swirling motions in the gas as the gas passes through the calming section to thereby reduce heat losses to the wall of the calming section, said damping means being disposed close to the path of the continuously moving arc.

2. Arc heater apparatus comprising, in combination, an arc heater, exhaust means connected to the arc heater including means forming a flow channel for heated gases, and a plurality of spaced radially extending baffles mounted in the flow channel and supported by the wall of the flow channel, heated gases from the arc flowing through the spaces between the baffles, large turbulent motions in the heated gas being damped out by the baffles as the gas flows therebetween, an unsubstantial amount of heat energy being transferred to the baffles and thence by conduction to the wall of the flow channel.

3. Gas arc heater apparatus comprising chamber forming means and means for producing a substantially continuously moving arc therein, exhaust channel forming means connected to the chamber including a calming section having a predetermined wall shape, and baffle means disposed in the calming section and supported by the wall of the calming section, said baffle means including means forming small passageways for the flow of gas therethrough, the baffle means being retained by the wall against movement in response to forces applied thereto by the gas, the baffle means being close to the path of the continuously moving arc.

4. Arc heater apparatus comprising, in combination, means forming an arc chamber, means for producing a substantially continually moving arc in the arc chamber, the arc moving in a substantially annular path, means for passing gas to be heated through the chamber, a churning movement being produced in the gas by movement of the hot arc therein, exhaust means connected to the chamber including a calming section near the arc path and nozzle means, and a plurality of spaced radially extending baffles disposed in the calming section and supported by the wall of the calming section, gas flowing through the spaces between the baffles having the churning movements therein reduced by frictional dissipation of the circumferential kinetic energy by said baffles thereby reducing the amount of heat lost to the wall of the calming section, the amount of heat transferred to the baffles and thence by conduction to the wall of the calming section being unsubstantial.

5. Arc heater apparatus comprising, in combination, means forming an arc chamber for gas to be heated, the chamber forming means being composed of a non-magnetic material, an annular electrode mounted in the chamber and insulated from the wall thereof, a stem electrode mounted in the chamber coaxially with the annular electrode, magnetic field producing means disposed outside the chamber forming means and producing a magnetic field in the chamber transverse to the arc path between the stem electrode and the annular electrode which causes the arc to move substantially continually around the annular electrode, the end of the stem electrode not extending axially toward the exhaust means a substantial distance beyond the arc path, exhaust means for the chamber including a calming section, and baffle means disposed in the calming section near the arc path, the baffle means including a plurality of spaced baffles for damping turbulence in the gas passing through the calming section and reducing the heat lost to the wall of the calming section.

6. Apparatus according to claim 3 in which the baffle means includes means forming a plurality of substantially cylindrical passageways of small diameter.

7. Apparatus according to claim 3 in which the baffle means includes a plurality of cylindrical elements mounted within the calming section, each of the cylindrical elements having a plurality of axial bores of small diameter therethrough through which the gas passes.

8. Apparatus according to claim 3 wherein the baffle means includes a cylindrical baffle element mounted in the calming section, the baffle element having a plurality of axially extending bores of small diameter therethrough through which the gas passes, and in which the wall portion of the calming section is additionally characterized as having an inwardly extending annular flange portion which abuts against the baffle element and retains the baffle element from movement within the wall in response to forces exerted thereon by the gas.

9. Apparatus according to claim 3 in which the baffle means includes a plurality of spaced slats, the turbulent gases passing through the space between the slats.

10. Arc heater apparatus comprising, in combination, means forming an arc chamber, means for producing a substantially continuously moving arc in the chamber, means for passing a gas having at least a certain conductivity through the chamber to be heated by the arc therein, exhaust means for the chamber including means forming a calming section near the path of the moving arc, and means disposed external to the calming section for setting up a magnetic field within the calming section having a predetermined direction with respect to the gas flow therein, the magnetic field causing eddy currents in the gas stream, the eddy currents consuming the kinetic energy of the churning action produced by heating the gas in the arc chamber and damping out large circumferential churning velocities in the gas thereby reducing the heat lost to the wall of the calming section.

11. Apparatus according to claim 10 in which the gas is additionally characterized as being thermally ionized.

12. Apparatus according to claim 10 in which the gas is additionally characterized as being ionization seeded.

13. Apparatus according to claim 10 in which the means for producing an arc in the chamber includes an annular electrode, a ring of insulating material mounting the annular electrode and insulating the annular electrode from the wall of the chamber, the wall of the chamber being composed of a non-magnetic material, a stem electrode disposed in the chamber coaxially therein and having a disc arcing portion of a large diameter at the end thereof and mounted substantially coplanar with the ring electrode, and magnetic field producing means disposed external to the chamber for setting up a magnetic field transverse to the arc path between the disc portion of the stem electrode and the annular electrode, the magnetic field causing the arc to move substantially continuously around the arcing surface and to heat the gas, substantial turbulence being produced in gas passing through the arc, said turbulence being reduced within the calming section.

References Cited

UNITED STATES PATENTS

| | | | |
|---|---|---|---|
| 2,515,069 | 7/1950 | Zola | 73—147 |
| 2,760,371 | 8/1956 | Borden. | |
| 3,073,984 | 1/1963 | Eschenbach et al. | 219—121 X |
| 3,191,092 | 6/1965 | Baker et al. | 351—111 |

FOREIGN PATENTS

| | | |
|---|---|---|
| 897,577 | 5/1962 | Great Britain. |
| 933,299 | 9/1955 | Germany. |

JAMES W. LAWRENCE, *Primary Examiner.*

C. R. CAMPBELL, *Assistant Examiner.*